United States Patent Office 2,961,910
Patented Nov. 29, 1960

2,961,910

CIRCULAR SAW FOR CUTTING HOT METALS

Günther Grassmann, Eddesse u/Peine 40,
Hannover, Germany

Filed Mar. 27, 1958, Ser. No. 724,460

Claims priority, application Germany Apr. 2, 1949

3 Claims. (Cl. 83—470)

This is a continuation-in-part of my prior application Serial No. 150,791, filed March 20, 1950. The invention relates to methods and apparatus to be used in metal cutting and more particularly to the cutting of hot metal.

Although the invention is applicable to the cutting of metals in a cold state, the greatest need in the metal working industry at present is for a more efficient and economical hot metal-cutting saw. Accordingly the illustration and description of the invention will be directed primarily to such use.

A serious problem facing the industry has been that the teeth of metal-cutting saws and in particular those for cutting hot metal become dull and unfit for further use after only a short period of time, usually no more than a few hours use. The saw blades must then be removed and their teeth resharpened. The frequent resharpening of the teeth shortens the life of the saw blades, increases the "down time" of the saw, interrupts production and materially increases costs. Saw blade design engineers and manufactures have expended a great deal of time and effort in seeking to determine the proper shape and configuration of the teeth and the use of proper heat treating to maintain the sharpness of the teeth but such efforts have failed to find a satisfactory answer to the problem.

A careful examination of a large number of used saw blades of well known types and makes disclosed that the tip portions of individual teeth were bent to tear drop shape with the direction of bending not rearwardly as one might have assumed and as happens when the teeth became overly hot, but strangely enough the tips were bent forwardly in the direction of cut. From thorough investigation of this strange phenomenon it appears that although the designers and manufactures of saw blades for cutting hot metal had used care in designing the tooth shape of such saws applying the rules and knowledge generally conceded to apply to single-direction tools, one factor has heretofore been underestimated, namely the condition under which the cutting edge of the tooth initially engages the work. This may be due to the fact that the initial contact is only an instantaneous phase and hence might be assumed to play only a secondary role in the entire cutting process.

In accordance with the present invention, it has been found that this previously accepted concept was in error. The stress on the tooth that occurs at the instant of initial engagement with the work is highly important and may result in rapid dulling of the teeth. A careful examination of a large number of saws of well known types disclosed that the saw blades with teeth of customary shape were mounted in the saws in such manner that the cutting face of the tooth when entering into cutting engagement with the workpiece meets it at an acute angle. This means that the tooth tip alone has to take the entire initial pressure. Under normal conditions it is impossible for the tooth tip to take such pressure without damage. As a result the tooth tips are forcibly bent by the excessive stresses to which they are subjected. Since the saw is simultaneously being fed toward the work, the tip portions of the teeth are bent inwardly and roll up in front of the cutting edge to form a tear drop shape that projects forwardly in the direction of cutting. This results in rapid dulling of the teeth.

It is an object of the present invention to overcome this difficulty and to increase materially the length of time a saw can be used between successive sharpenings and also greatly increase the overall life of the saw blade. This is achieved by specific correlation of the shape of the blade teeth and the position of the workpiece with respect to the saw blade so that when meeting the work at each entry of the individual teeth the cutting edge of each tooth is substantially parallel to the entering face of the workpiece. By reason of the parallel relationship of the cutting edge of the tooth and the entering face of the workpiece, the force of initial engagement of the tooth with the work is distributed over a large area instead of being concentrated at the extreme tip of the tooth. The distribution of force results in lower unit pressure which does not exceed the strength of the tooth. The decrease in the unit stress to which the teeth are subjected has been found to avoid the rapid dulling of the teeth and in particular the phenomenon of forming tear drops on the tips of the teeth as described above. In comparison with prior practice, application of the principles of the present invention to a hot metal cutting saw increases the time between successive sharpenings more than tenfold. For example a saw which formerly became dull in less than 8 hours could be used for 80 hours without requiring re-sharpening after it had been modified in accordance with the invention.

The objects and advantages of the invention will be more fully understood from following description and claims in conjunction with the accompanying drawings which illustrate by way of example a preferred embodiment of the invention and a modified tooth form. In the drawings:

Figure 1:
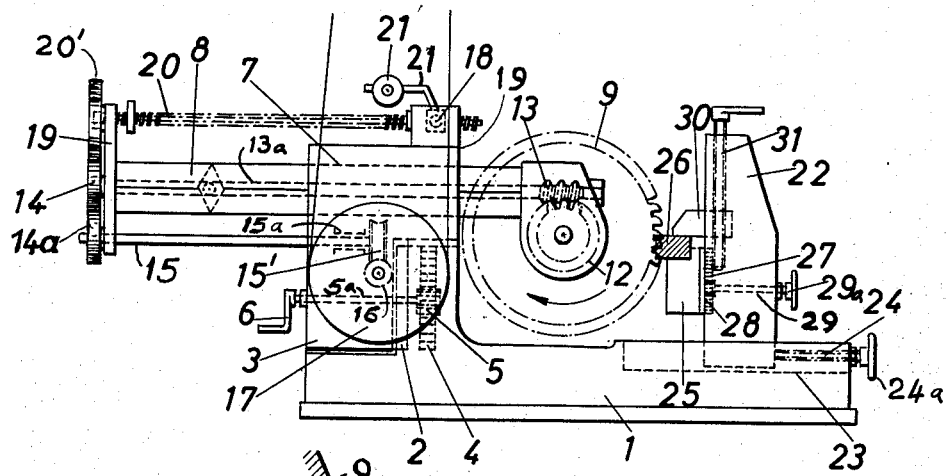
Fig. 1 is a side elevation of a hot metal cutting saw in accordance with the invention.

In Fig. 1 there is a shown a hot iron saw having a base 1 provided with a vertical guide 2 in which a slide 3 is mounted for vertical up and down movement. The slide 3 is movable upwardly and downwardly relative to the base by means of a rack 4 fixed to the base 1 and a pinion 5 which meshes with the rack 4 and is carried by a shaft 5a rotatably mounted on the slide. The pinion 5 is rotatable by means of a crank 6 fixed on one end of the shaft 5a to move the slide up or down in order to position it at a desired height relative to the base. The slide is frictionally held in selected position. Suitable clamping or locking means may be provided if desired but are not shown as such means are well known in the art.

The slide 3 provides a horizontal guide 7 for a carriage 8 at the inner end of which a circular saw blade 9 is rotatably mounted with its axis horizontal and perpendicular to the direction of movement of the carriage 8. The saw blade 9 is rotationally driven in the direction of the arrow by means of a worm wheel 12 which is coupled to the saw blade and engages a worm 13 on the inner end of a drive shaft 13a which extends lengthwise of the carriage 8. At its outer end the shaft 13a carries a gear 14 which meshes with a gear 14a on a second shaft 15 which is parallel to the shaft 13a. The shaft 15 is axially slidable in a worm gear 15' rotatably mounted on the slide 3 but is rotatably coupled with the worm gear for example by means of a spline coupling 15a. The worm gear 15' is driven by a worm 16 fixed to a pulley 17 driven by a suitable motor (not shown). The sliding connection between the shaft 15 and the worm gear 15' permits horizontal movement of the carriage 8 on the guide 7 while providing a constant driving connection between the motor and the saw blade.

The carriage 8 which carries the saw blade 9 is movable horizontally on the guide 7 by means of a split nut 18 which is mounted on the slide 3 and is engageable with a threaded feed spindle 20 which is rotatably mounted on the carriage 8 by bearing members 19. The feed spindle 20 is rotatably driven at a selected speed for example by suitable gears represented by a gear 20' on the spindle meshing with gear 14 through which the saw blade is driven. The feed spindle is thus rotated at a selected speed ratio in relation to the rotation of the saw blade. While a single gear 20' has been shown to simplify the drawings, it will be understood that the feed spindle 20 may be connected to the driving mechanism of the saw through a chain speed transmission providing a selection of gear ratios. The nut 18 is releasably engageable with the feed spindle 20 by means of an operating lever 21 carrying an adjustable weight 21' and can be disengaged by swinging the lever 21 manually in a clockwise direction from the engaged position shown in the drawings. The pitch of the feed spindle 20 and the speed ratio between the spindle 20 and the drive shaft 13a of the saw blade are selected to provide a selected rate of feed of the saw into the work as the saw blade rotates.

The saw is provided with a suitable work support comprising a column 22 slidably mounted on a guide portion 23 of the base 1 and movable horizontally in a direction toward and away from the saw blade by means of a threaded spindle 24 rotatable by a hand wheel 24a. The column 22 is provided with a work rest or bracket 25 for supporting a workpiece 26 having an approximately flat upper face 26a. The bracket 25 is slidable vertically on the column 22 and is adjustable in a vertical direction by means of a rack 27 on the bracket engaging a pinion 28 on a shaft 29 which is rotatably supported by the column 22 and is rotatable by a hand wheel 29a. A clamping jaw 30 is positioned above the bracket 25 on column 22 and is movable vertically by a rotatable threaded spindle 31 so as to bring the clamping jaw into engagement with a workpiece 26 on the bracket 25 and clamp it firmly in position on the bracket.

In the operation of the saw a workpiece 26 is firmly clamped on the bracket 25 and the rotating saw blade 9 is fed into the work at a selected rate by the feed spindle 20. As the saw blade rotates, the individual teeth 32 on the periphery of the saw blade successively engage the workpiece 26 and each makes a cut through the work as illustrated schematically in Fig. 2. Each of the teeth 32 has a tip face 33, a flat forward or cutting face 34 and a rear face 35.

Figure 2:
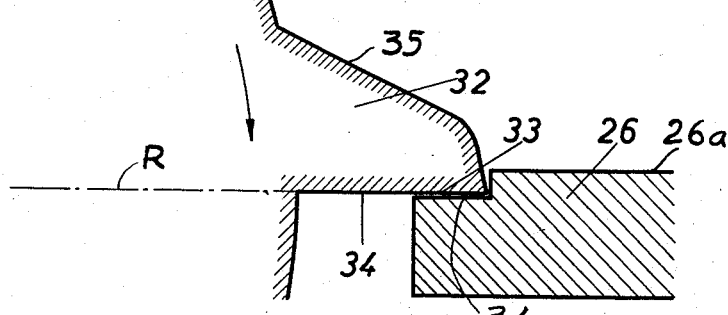
Fig. 2 is an enlarged diagrammatic view illustrating the relative position between one of the saw teeth and a workpiece.

In accordance with the present invention the shape of the saw blade teeth and the position of the workpiece 26 relative to the saw are so inter-related that at each entry of the individual teeth into the workpiece the cutting face 34 of each tooth is essentially parallel to the entering face 26a of the workpiece 26 at the instant the tooth engages the work. Moreover, the spacing of the teeth, the speed of rotation of the saw blade and the rate of feed of the blade toward are inter-related so that a substantial portion 34a of the cutting face 34 of the tooth engages the work and is substantially flat with respect to the entering face of the workpiece as illustrated in Fig. 2. By reason of this relationship between the cutting face of the tooth and the workpiece, the stresses applied to the tooth at the instant of initial contact with the work are distributed over a substantial area of the cutting face. Preferably the stress of initial contact is distributed over at least one quarter of the cutting face. The distribution of the stresses avoids the instantaneous stress concentration characteristic of previously used saws and thereby avoids the rapid dulling effect of concentrated stresses.

In the embodiment illustrated in Fig. 2, the cutting face 34 of each tooth is disposed radial to the saw blade as indicated by the radius line R. The tip face 33 is disposed at an angle of approximately 70 to 80 degrees to the cutting face so as to provide a strong tip portion while at the same time having sufficient rake to provide clearance. With the tooth shape shown in Fig. 2 the workpiece 26 is positioned so that its entering face 26a lies in a plane that includes the axis of the saw blade and is hence radial with respect to the saw. This relationship is obtained by vertically positioning the workpiece 26 relative to the saw. As described above, the saw carriage is movable vertically by means of the rack 4 and pinion 5 while the work supporting bracket 25 is likewise movable vertically by means of the rack 27 and pinion 28 to obtain the desired relationship. As illustrated in Fig. 2 approximately ⅓ of the cutting face of the tooth engages the work at the instant of initial contact.

Instead of being radial with respect to the saw blade as illustrated in Fig. 2 the cutting face 34 of each tooth may have a positive or negative rake. The rake or cutting angle is considered to be positive when the cutting face of the tooth lies behind the radius drawn from the tip of the tooth to the center of the saw blade and to be negative when the cutting face of the tooth lies ahead of such radius. For good results in accordance with the present invention the saw blade teeth may have a negative rake of up to approximately 50 degrees but should not have a positive rake exceeding approximately 10 degrees. It will be understood that if the teeth have too great a positive rake it becomes impossible to position the saw blade with respect to the workpiece so that the entering face of the workpiece lies parallel to the cutting faces of the teeth at the instant of initial engagement. Hence the extreme tips of the teeth become overloaded as described above and rapid dulling of the saw blade occurs.

If the teeth of the saw blade have zero rake, the workpiece is positioned so that its entering face lies in a plane that passes through the axis of rotation of the saw blade. If the teeth of the saw blade have a negative rake, the workpiece is positioned so that its entering face lies in a plane that is spaced from the axis of rotation of the saw blade a distance equal to the radius of the blade multiplied by the sine of the rake angle so that the cutting faces of the teeth at each entry thereof into the workpiece are parallel to the entering face of the workpiece at the instant of initial engagement. Likewise, if the teeth have a positive rake, the plane of the entering face of the workpiece is spaced a like distance from the axis but in the opposite direction.

Figure 3:
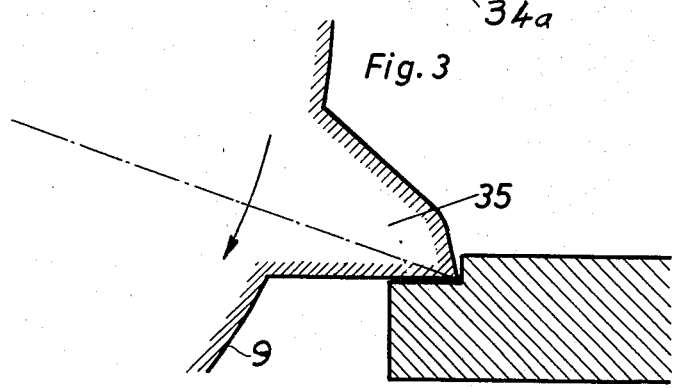
Fig. 3 is a similar view showing the relative position between a workpiece and a saw tooth having a negative rake.

In Fig. 3 there is shown a preferred form of the present invention in which the teeth 36 of the saw blade have a negative rake of the order of 20 degrees. As in the embodiment of Fig. 2 the tip face of the tooth is disposed at an angle of approximately 70 to 80 degrees to the cutting face so that the tip is relatively blunt. It will be understood that when the teeth of the saw blade have a negative rake as illustrated in Fig. 3, the workpiece 26 is positioned so that its entering face 26a is not radial to the saw blade but is disposed at an angle to the radius equal to the angle of rake. Thus instead of being at substantially the same level as the axis of the saw as illustrated in Figs. 1 and 2 the workpiece shown in Fig. 3 is positioned below the saw blade axis. This relationship is obtained by raising the saw blade carriage 8 or by lowering the workpiece supporting bracket 25 as described above. By thus supporting the workpiece so that its entering face 26a is disposed at the same angle to the radius of the saw as the cutting face of the tooth the correct relationship is obtained so that, at the instant of initial engagement, the cutting face of the tooth is substantially parallel to the entering face of the workpiece.

The following examples are illustrative of saws in accordance with the invention:

|  | Example I— Rake angle 0 | Example II— Rake angle negative |
|---|---|---|
| Diameter of Saw Blade | 1,850 mm φ | 1,850 mm φ. |
| Spacing of Teeth Tip to Tip | 19.3 mm | 19.3 mm. |
| Length of Cutting Face Root to Tip | 13 mm | 13 mm. |
| Rake angle of Cutting Face | 0 | 30° negative. |
| Rate of Rotation of Saw Blade | 1,020 per/min | 1,020 per/min. |
| Rate of Feed of Saw Blade | 240 mm./sec | 240 mm./sec. |

It will be understood that these values are given merely by way of example and not as a limitation of the invention.

The discovery of the critical relationship between the shape of the saw blade teeth and the position of the workpiece relative to the saw so that the cutting face of each tooth is essentially parallel to the entering face of the workpiece at the instant of initial engagement for each entry of the individual teeth into the workpiece has resulted in greatly increasing the life of the saw blade and likewise increasing the time of use between successive sharpening. By reducing the "down-time" or the saw for sharpening, the invention further increases the productivity of the saw.

What I claim and desire to secure by Letters Patent is:

1. A power saw for cutting a hot metal workpiece having an approximately flat surface comprising a circular saw blade with a multiplicity of teeth angularly spaced on its periphery, each tooth having a substantially flat forward cutting face with a selected rake, the rake of all of said teeth being equal, means for rotationally driving said saw blade to move said teeth in a forward direction, means for supporting said workpiece in a position to be engaged by said teeth with said substantially flat surface facing rearwardly with respect to the direction of movement of said teeth and hence constituting the entering face of said workpiece, means for continually positioning said saw blade relative to said workpiece and in dependence on said rake so that each of said cutting faces at each successive entry into the workpiece is essentially parallel with respect to the entering face of the workpiece when each successive tooth initially engages said workpiece, means cooperative with said means for driving the blade to feed the blade into the workpiece at a preselected rate of feed in dependence upon the speed of rotation of the blade and the angular spacing of the teeth for causing each cutting face to enter the workpiece and initially engage the workpiece over a substantial area of each cutting face of the respective teeth, thereby to distribute the initial stresses of engagement of each successive tooth with the workpiece over said substantial area to preclude localized pressures.

2. A power saw for cutting a hot metal workpiece having an approximately flat surface comprising a circular saw blade with a multiplicity of teeth angularly spaced on its periphery, each tooth having a substantially flat forward cutting face with approximately zero degrees rake, the rake of all of said teeth being equal, means for rotationally driving said saw blade to move said teeth in a forward direction, means for supporting said workpiece in position to be engaged by said teeth with said substantially flat surface disposed approximately radial with respect to the axis of said blade and facing rearwardly with respect to the direction of movement of said teeth and hence constituting the entering face of said workpiece, means for continually positioning said saw blade relative to said workpiece and in dependence on said rake so that each of said cutting faces at each successive entry into the workpiece is essentially parallel with respect to the entering face of the workpiece when each successive tooth initially engages said workpiece, means cooperative with said means for driving the blade to feed the blade into the workpiece at a preselected rate of feed in dependence upon the speed of rotation of the blade and the angular spacing of the teeth for causing each cutting face to enter the workpiece and initially engage the workpiece over a substantial area of each cutting face of the respective teeth, thereby to distribute the initial stresses of engagement of each successive tooth with the workpiece over said substantial area to preclude localized pressures.

3. A power saw for cutting a hot metal workpiece having an approximately flat surface comprising a circular saw blade with a multiplicity of teeth angularly spaced on its periphery, each tooth having a substantially flat forward face with negative rake, the rake of all of said teeth being equal, means for rotationally driving said saw blade to move said teeth in a forward direction, means for supporting said workpiece in position to be engaged by said teeth with said substantially flat surface disposed at an angle with respect to the radius of said saw blade approximately equal to the angle of said rake and facing rearwardly with respect to the direction of movement of said teeth and hence constituting the entering face of said workpiece, means for continually positioning said saw blade relative to said workpiece and in dependence on said rake so that each of said cutting faces at each successive entry into the workpiece is essentially parallel with respect to the entering face of the workpiece when each successive tooth initially engages said workpiece, means cooperative with said means for driving the blade to feed the blade into the workpiece at a preselected rate of feed in dependence upon the speed of rotation of the blade and the angular spacing of the teeth for causing each cutting face to enter the workpiece and initially engage the workpiece over a substantial area of each cutting face of the respective teeth, thereby to distribute the initial stresses of engagement of each successive tooth with the workpiece over said substantial area to preclude localized pressures.

References Cited in the file of this patent

UNITED STATES PATENTS

| 1,446,726 | Sloan | Feb. 27, 1923 |
| 1,514,012 | Rambuscheck | Nov. 4, 1924 |
| 1,858,552 | Keenan et al. | May 17, 1932 |

FOREIGN PATENTS

| 102,415 | Austria | Mar. 25, 1899 |
| 389,497 | France | Sept. 10, 1908 |